(No Model.)
J. YATES.
DEVICE FOR FACILITATING TAKING PILLS.
No. 442,698. Patented Dec. 16, 1890.
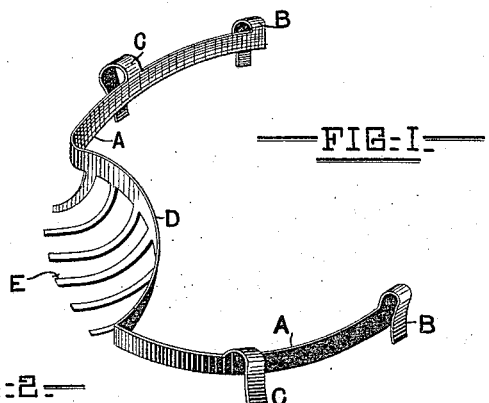
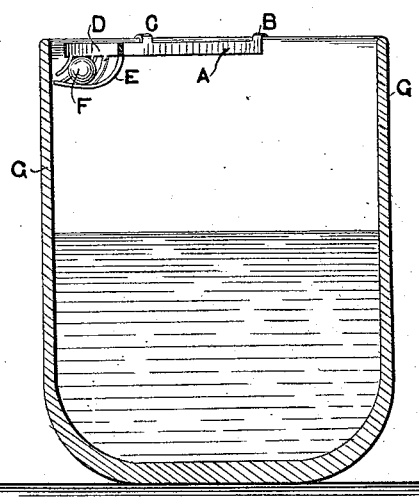
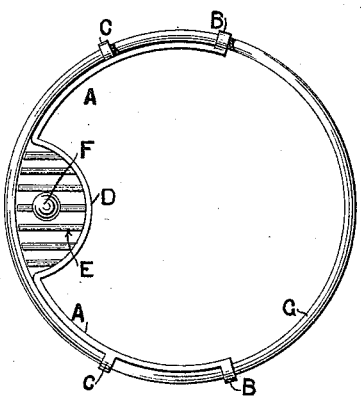
Witnesses
J. H. Riches
Thomas Dennis
Inventor
Joseph Yates
By F. Prince
Attorney

UNITED STATES PATENT OFFICE.

JOSEPH YATES, OF LONDON, ENGLAND.

DEVICE FOR FACILITATING TAKING PILLS.

SPECIFICATION forming part of Letters Patent No. 442,698, dated December 16, 1890.

Application filed September 22, 1890. Serial No. 365,755. (No model.)

*To all whom it may concern:*

Be it known that I, JOSEPH YATES, engineer, a subject of the Queen of Great Britain, residing at London, England, have invented a new and useful Appliance to Facilitate Taking Pills, (Medicine,) of which the following is a specification.

This invention consists of an arrangement to hold a pill near the top of the inside of a glass in such a manner that by drinking water out of the glass the pill is at once washed forward down the throat.

To enable my invention to be properly understood, I will proceed to describe the same with aid of the accompanying drawings.

Figure 1 is a detached perspective view of the invention; Fig. 2, a sectional side view of same applied to a glass, and Fig. 3 a plan of the device.

A is a metal band bent to the contour of the inside of a glass, fitted with hooks B C to enable it to be held in a glass. A bent-in portion D has bent prongs E attached, so arranged as to form a receptacle for a pill F.

G is the glass.

On a pill being placed in its receptacle and water drunk from the glass, the water, in passing through the prongs E, first washes forward the pill down the throat, thereby greatly assisting the taking of pills.

Having now described my invention, what I claim is—

An appliance arranged to be fitted to a glass near its inside edge, formed with an open-bottom receptacle to hold a pill, so that the pill may be washed forward on drinking water out of the glass, as set forth.

JOSEPH YATES.

Witnesses:
    F. PRINCE,
1 *Quality Court, London, W. C.*
    THOMAS DENNIS,
94 *Corporation Buildings, Farringdon Rd., London.*